United States Patent [19]

Handke et al.

[11] Patent Number: 5,467,851

[45] Date of Patent: Nov. 21, 1995

[54] SHOCK ABSORBER WITH A CHECK VALVE MODULE AND A CHECK VALVE MODULE FOR A SHOCK ABSORBER

[75] Inventors: Günter Handke, Euerbach; Lars Rossberg, Schweinfurt; Andreas Zietsch, Röthlein, all of Germany

[73] Assignee: Fichtel & Sachs AG, Schweinfurt, Germany

[21] Appl. No.: 213,190

[22] Filed: Mar. 15, 1994

[30] Foreign Application Priority Data

Mar. 16, 1993 [DE] Germany ............... 43 08 328.5
Sep. 17, 1993 [DE] Germany ............... 43 31 584.4

[51] Int. Cl.⁶ .................. F16F 9/46; F16K 31/02; B60G 17/08
[52] U.S. Cl. ............ 188/299; 137/599.2; 188/319; 267/179
[58] Field of Search ............... 188/299, 314, 188/315, 318, 319; 251/129.02; 137/599.2; 267/179

[56] References Cited

U.S. PATENT DOCUMENTS

| | | | |
|---|---|---|---|
| 4,854,429 | 8/1989 | Casey | 137/599.2 |
| 4,902,034 | 2/1990 | Maguran et al. | |
| 5,173,578 | 12/1992 | Tama | 267/179 |

FOREIGN PATENT DOCUMENTS

| | | |
|---|---|---|
| 0133623 | 3/1985 | European Pat. Off. |
| 0268520 | 5/1988 | European Pat. Off. |
| 0490262 | 6/1992 | European Pat. Off. |
| 0530886 | 3/1993 | European Pat. Off. |
| 2665497 | 2/1992 | France . |
| 8610374 | 12/1987 | Germany . |
| 4007261 | 9/1991 | Germany . |
| 4114305 | 6/1992 | Germany . |
| 9209505 | 11/1992 | Germany . |
| 2233737 | 1/1991 | United Kingdom . |
| 2234041 | 1/1991 | United Kingdom ............ 188/318 |

*Primary Examiner*—Matthew C. Graham
*Attorney, Agent, or Firm*—Nils H. Ljungman & Associates

[57] ABSTRACT

Shock absorber with adjustable damping force, comprising a cylinder, an axially movable piston rod with a piston connected to it, a number of fluid chambers with capacities which can be changed relative to one another as a function of the movement of the piston rod relative to the cylinder, and fluid connections between at least two of the fluid chambers, whereby at least one of the fluid connections has a check valve module, whereby the check valve module is also designed with at least one valve seat, whereby a valve check element can be elastically applied against the valve seat in a check position, whereby this valve check element can also be adjusted by means of a field coil in opposition to the closing force of at least one spring in a number of positions, whereby the spring(s) is/are a unit of a row inside the check valve module, and possibly an intermediate module, which consists of a control chamber discharge valve body and a supplemental discharge valve body, characterized by a connection (17, 29, 15a, 15c, 19a, 19c, 25a, 25c, 27a, 27c, 37a, 37c) between any of the springs (29, 17) and inside the row of adjacent components of the spring(s), so that the adjacent parts form a pre-assembled unit, whereby the connection (17, 29, 15a, 15c, 19a, 19c, 25a, 25c, 27a, 27c, 37a, 37c) can withstand a load which corresponds to the sum of the spring force and weight of the parts exerting a force on it.

12 Claims, 10 Drawing Sheets

5,467,851

SHOCK ABSORBER WITH A CHECK VALVE MODULE AND A CHECK VALVE MODULE FOR A SHOCK ABSORBER

BACKGROUND OF THE INVENTION

1. Field of the Invention

This invention generally relates to a check valve module in a shock absorber with adjustable damping force, the shock absorber comprising a cylinder, an axially movable piston rod with a piston connected thereto, a number of fluid chambers with capacities which can be changed relative to one another as a function of the movement of the piston rod relative to the cylinder, and fluid connections between at least two of the fluid chambers, wherein at least one valve has a check valve module. The check valve module is designed with at least one valve seat, whereby a valve check element can be elastically applied against the valve seat in a check position, whereby this valve check element can also be adjusted by means of a field coil in opposition to the closing force of at least one spring in a number of positions, whereby the spring(s) is/are a unit of a row inside the check valve module, and possibly an intermediate module which includes a control chamber discharge valve body and a supplemental discharge valve body.

2. Background Information

German Laid-Open Patent Application No. 41 14 305 discloses a check valve module which has a number of springs which apply a prestress to the individual parts of the check valve module. In mass production, the installation of the individual parts usually entails some positioning problems, since the individual parts must usually be introduced by opening the housing of the check valve module. The parts are small and are correspondingly difficult to handle. All the individual parts between the check valve plate and the magnet armature must be inserted into one another. During assembly, the individual parts, in particular those which are inserted in the armature, can often slip out of the armature and assume an uncontrolled position inside the check valve module. Under some circumstances, it then becomes impossible to correctly install the armature. All the parts must thence be carefully removed from the housing and the assembly process must be repeated.

The type of assembly described immediately above may be acceptable for the manufacture of a prototype, but it appears to be out of the question for efficient mass production operations in which, nowadays, the allowable number of defects tends to be measured in terms of defects per million finished products.

OBJECT OF THE INVENTION

The object of this invention is to improve known check valve modules so that the assembly problems described above can be eliminated. It is intended that this improvement not entail any deterioration in the operation of the check valve module.

SUMMARY OF THE INVENTION

The invention teaches that this object can be achieved, in accordance with a check valve module as described above in the "Field of the Invention", with a connection between any of the springs and inside the row of adjacent components of the spring or springs, so that the adjacent parts form a pre-assembled unit, whereby the connection can withstand a load which corresponds to the sum of the spring force and weight of the parts exerting a force on it. This and other aspects of the present invention will be more clearly understood from the disclosure hereinbelow.

In accordance with a preferred embodiment of the present invention, a binding connection between the individual spring and its adjacent components is established outside, that is, away from, the check valve module. The result is a small sub-assembly which can be handled significantly more easily than the individual parts in known procedures and devices. As a result of the connections, the parts can essentially no longer fall out, thereby eliminating the need to repeat an assembly operation.

In accordance with an additional advantageous characterizing feature of the invention, a housing-side plate preferably has a guide facing a pot, or cup, whereby the guide is connected to the pot so that the spring forces inside the row of components are less than the retention forces of the connection between the pot and the plate.

Optionally, the connection of the spring can also be a positive connection, and can consist of a force-fitted connection of the adjacent components, or the spring can be connected in a form-fitted manner, whereby the spring is engaged in the vicinity of its terminal coils with the adjacent components. These methods can essentially guarantee the reliable retention of the component. The correct retention of the module can also be "felt" by the assembler or "sensed" by a robot equipped with appropriate sensors.

To eliminate friction in the event of a change in the length of the springs, an additional advantage afforded by the invention is that the terminal coils of the spring of the assembly unit can preferably have different coil diameters. As a result of this measure, there can be a ring-shaped space in the vicinity of the spring coils between the spring and the adjacent parts of the module.

There are a number of applications in the check valve unit for the teachings of the invention. For example, the spring can advantageously be located between the control chamber discharge valve body and the supplemental discharge valve body.

The invention is particularly effective if the spring is located between the control chamber discharge valve body and the check valve plate. In this configuration, the control chamber discharge body is oriented vertically, and is simultaneously centered on the armature.

In the embodiments of check valve modules in which the closing spring and the magnet armature are arranged in a row, the spring can advantageously be connected between a support surface on the housing inside the check valve module and the check valve plate.

In an additional application, the guide can have a connection by means of the closing spring to the check valve plate, so that there can be an assembly unit which comprises essentially all the components of the row inside the check valve module which correspond to the housing. The check valve plate can thereby be centered during assembly by means of the closing spring.

The retention force of the connection between the guide on the housing-side plate and the pot can preferably be provided by a force fit. This type of connection is appropriate when it is advantageous to have an entire check valve module which can later be disassembled, if necessary. Alternatively, it is possible to absorb the retention forces of the connection between the guide on the housing-side plate and the pot by means of a welded joint. A low-heat welding process is recommended, e.g. condenser discharge welding, so that there is no absorption of heat or damage to the seals and gaskets.

BRIEF DESCRIPTION OF THE DRAWINGS

The invention is explained below in greater detail with reference to the accompanying figures, wherein.

DESCRIPTION OF THE PREFERRED EMBODIMENT

Figure 1:
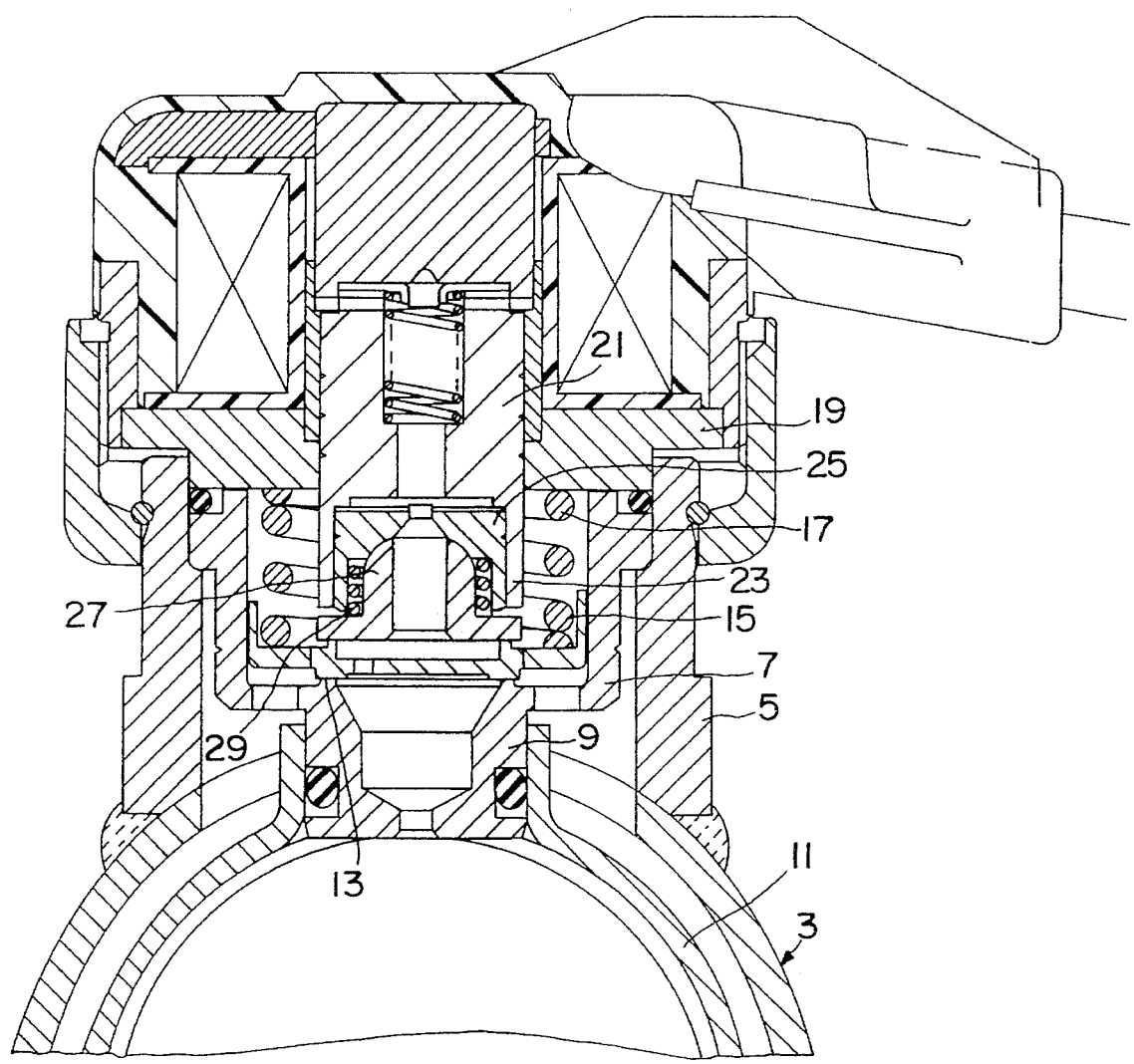
FIG. 1 shows an overall view of the check valve.

FIG. 1 shows a check valve module 1 (see FIG. 1a), the basic design and function of which are generally well-known. Preferably welded onto a container tube 3 is a pipe 5, which pipe 5 holds the essential part of the valve. A pot, or cup, 7 is preferably engaged by means of its pipe sockets 9 in an adapter tube 11. The pot 7 also encloses a check valve seat 13 on which a check valve plate 15 is supported, which plate 15 is prestressed by a coil spring 17, which spring 17 is connected on the housing side to a plate 19. Inside the plate 19, there is preferably a central opening for a magnet armature 21. The magnet armature 21 can have a ring flange 23 which projects downward, which holds and centers a control chamber discharge valve body 25. The control chamber discharge valve body 25 preferably has a conical guide area, which in turn guides a supplemental discharge body 27. Between the control chamber discharge valve body 25 and the supplemental discharge body 27, there is preferably a spring 29 which prestresses the two valve parts 25 and 27 in relation to one another.

During the assembly of the check valve module 1, the shock absorber having the welded-on pipe sockets 5 is preferably equipped with the pot 7. The valve plate 15 is preferably placed on the check valve seat 13. Then the coil spring or springs 17 are introduced. The magnet armature 21 is preferably introduced into the plate 19. The magnet armature 21 can have a completely-assembled field winding 31 (see FIG. 1a), with a valve cover, on its reverse side. The control chamber discharge valve body 25 and the supplemental discharge body 27 are preferably in the ring flange 23 of the magnet armature 21. The control chamber discharge valve body 25 and the supplemental discharge body 27 are preferably connected by means of the spring 29 and form a single module. Once the plate 19 has been installed, the control chamber discharge body 25 and the supplemental discharge body 27 can essentially no longer fall apart.

Figure 1A:
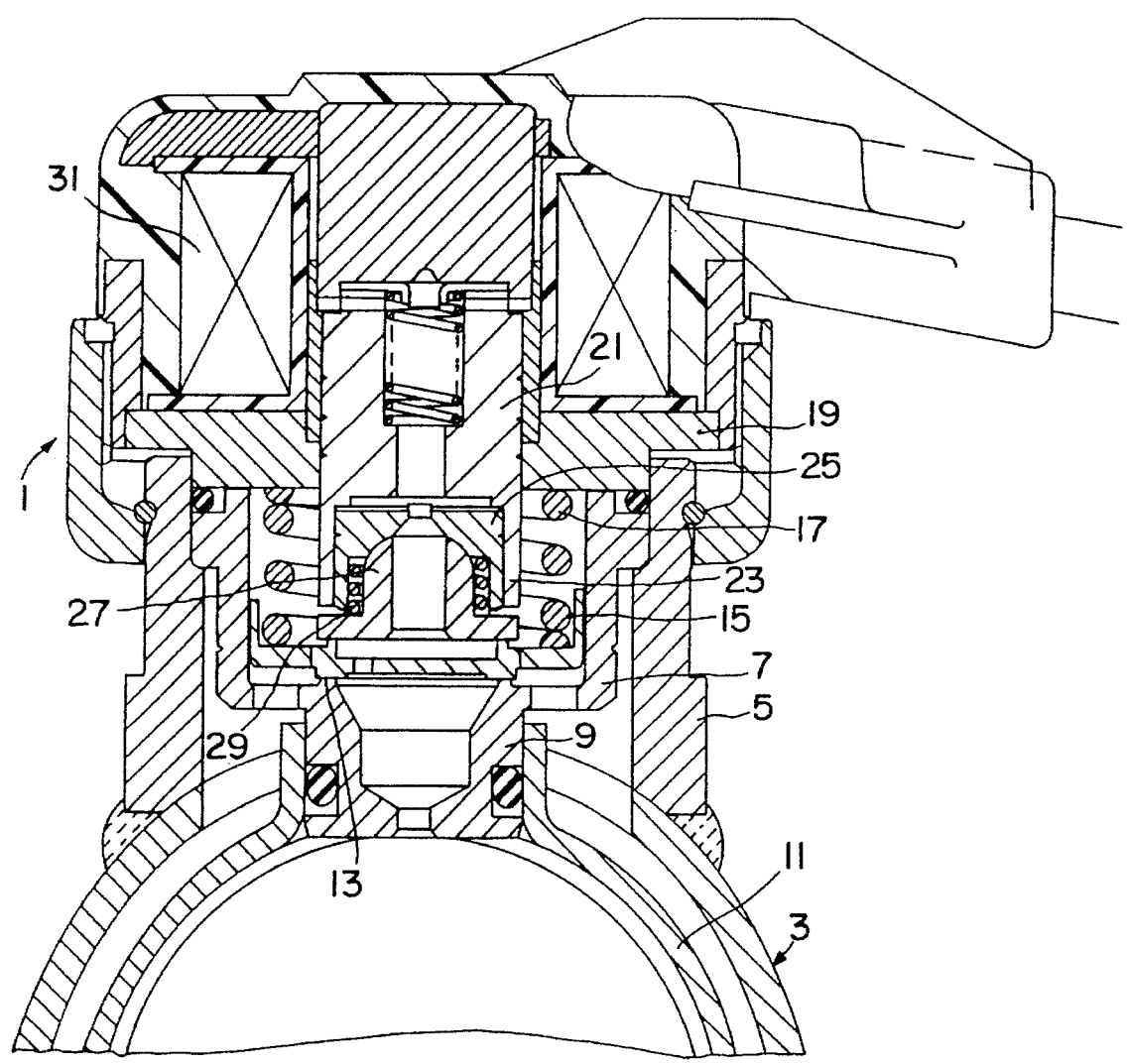
FIG. 1a is substantially the same view as FIG. 1, but more detailed.

FIG. 1a more particularly illustrates various features of a check valve according to the present invention.

Figure 2:
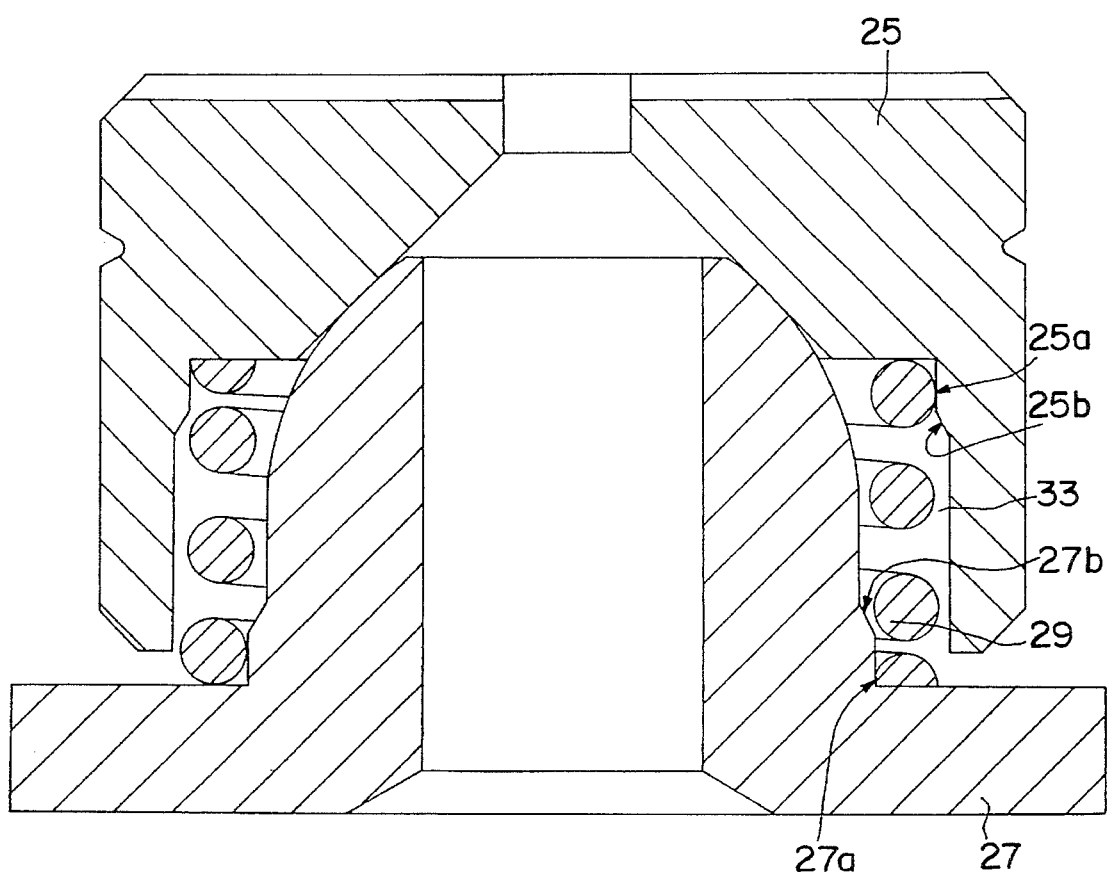
FIG. 2 shows the spring with a force fit connection.

FIG. 2 is restricted to an illustration of check valve module 11 in the area between the control chamber discharge valve body 25 and the supplemental discharge body 27, plus the spring 29. The bodies 25/27 are preferably connected by means of the spring 29. This spring 29 is preferably fitted to the control chamber valve discharge body 25 at its outside diameter, and to the supplemental discharge body 27 at its inside diameter by means of a slight force fitting. Preferably, the connection is configured to be capable of absorbing axial tensile stresses which exceed the dead weight of one of the valve bodies 25/27, so that the connection can be reliably maintained during the assembly process. The force-fitted seats 25a/27a of the valve bodies 25/27 can generally very easily result from surfaces 25b/27b, so that there can be a ring-shaped gap formed between the spring 29 and the valve bodies 25/27. Therefore, essentially no friction will occur in the event of a relative movement between the control chamber discharge valve body 25 and the spring 29, or between the supplemental discharge body 27 and the spring 29.

Thus, as shown in FIG. 2, in accordance with a preferred embodiment of the present invention, bodies 25 and 27 can be connected by spring 29, as shown. Body 25 may generally be considered to be a generally cup-shaped receptacle for receiving a major portion of body 27. In this respect, body 27 is generally configured to protrude into the general cup shape of body 25. The interior wall portion of body 25, that is, that wall portion of the general cup shape which faces generally towards the central axis of the check valve, preferably has a major portion, that is, the portion not constituted by seat 25a, which essentially does not come into contact with spring 29. Surface 25b is preferably frustoconical and serves as a transition into seat 25a, wherein seat 25a, preferably a surface being parallel to the central axis of the check valve, contacts a terminal coil of spring 29, at an outer diameter of the terminal coil, so as to provide a secure force-fit of that terminal coil of spring 29.

Likewise, the exterior surface of body 27, that is, that surface facing generally away from the central axis of the check valve, preferably has a major portion, that is, that portion not constituted by seat 27a, which essentially does not come into contact with spring 29. Surface 27b, like surface 25b, is preferably frustoconical and serves as a transition into seat 27a, wherein seat 27a, preferably a surface being parallel to the central axis of the check valve, contacts the other terminal coil of spring 29, at an inner diameter of the terminal coil, so as to provide a secure force-fit of that terminal coil of spring 29.

Figure 3:
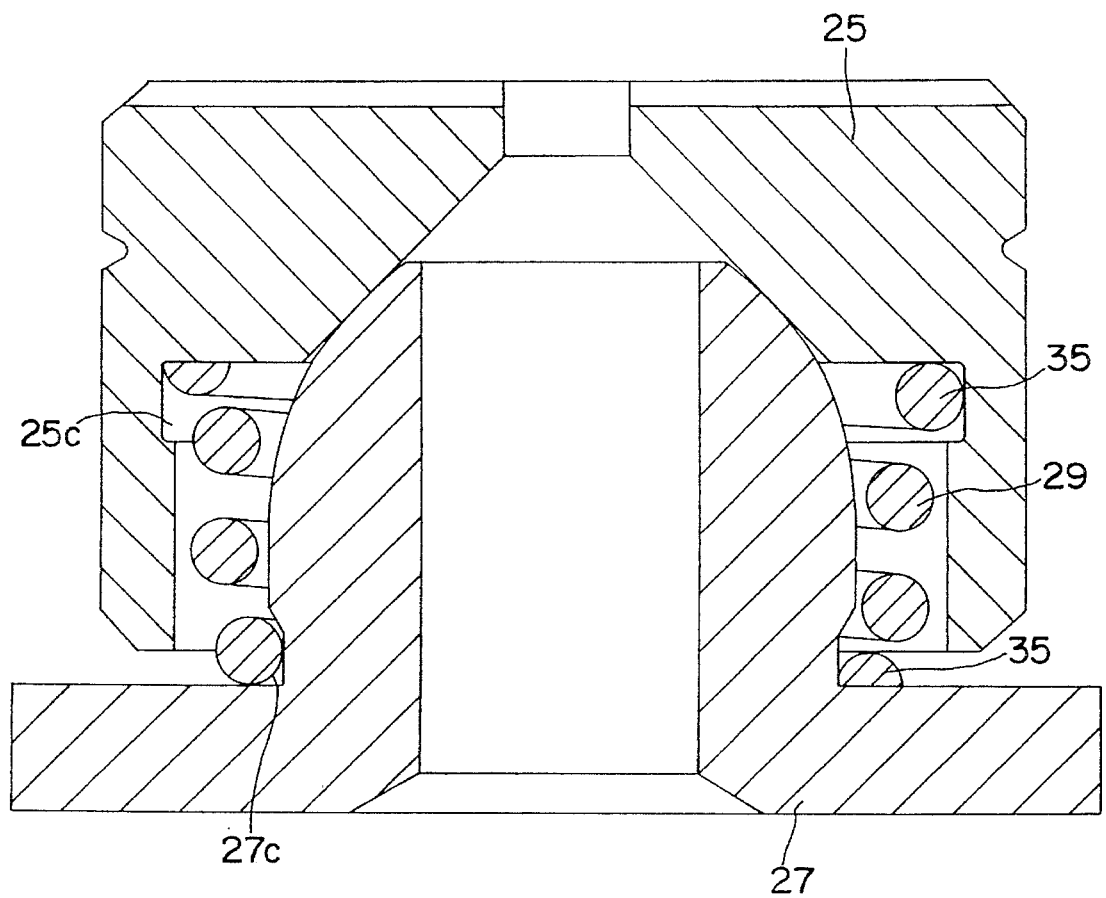
FIG. 3 shows the spring with a form fit connection.

In a variation of the arrangement illustrated in FIG. 2, the module illustrated in FIG. 3 has a form-fitted connection between the spring 29 and the control chamber discharge valve body 25 and the supplemental discharge body 27. The form-fitted connection can be achieved by means of a lock, or locking connection, between the spring 29 and the valve bodies 25/27. The lock can be formed by the terminal coils 35 of spring 29 and corresponding locking grooves 25c/27c. For this type of connection, a spring 29 can preferably be used in which the terminal coils have different coil diameters.

Thus, as shown in FIG. 3, in accordance with a preferred embodiment of the present invention, the spring 29 connecting bodies 25 and 27 may preferably be form-fitted with bodies 25 and 27. In this respect, body 25 preferably has a groove portion 25c which is essentially constituted by a generally cylindrical area having a greater diameter than the rest of the inner wall portion of body 25. This groove portion 25c is thus preferably configured to accept a terminal coil 35 of spring 29 wherein such a terminal coil 35 has a greater diameter than the other coils of spring 29. Additionally, body 27 preferably has a groove portion 27c indented into the outer surface of body 27, such a groove portion 27c essentially being constituted by an indented cylindrical surface being parallel to the central axis of the check valve. This groove portion 27c is thus preferably configured to accept the other terminal coil 35 of spring 29, wherein such a terminal coil 35 has a smaller diameter than the other coils of spring 29.

Figure 4:
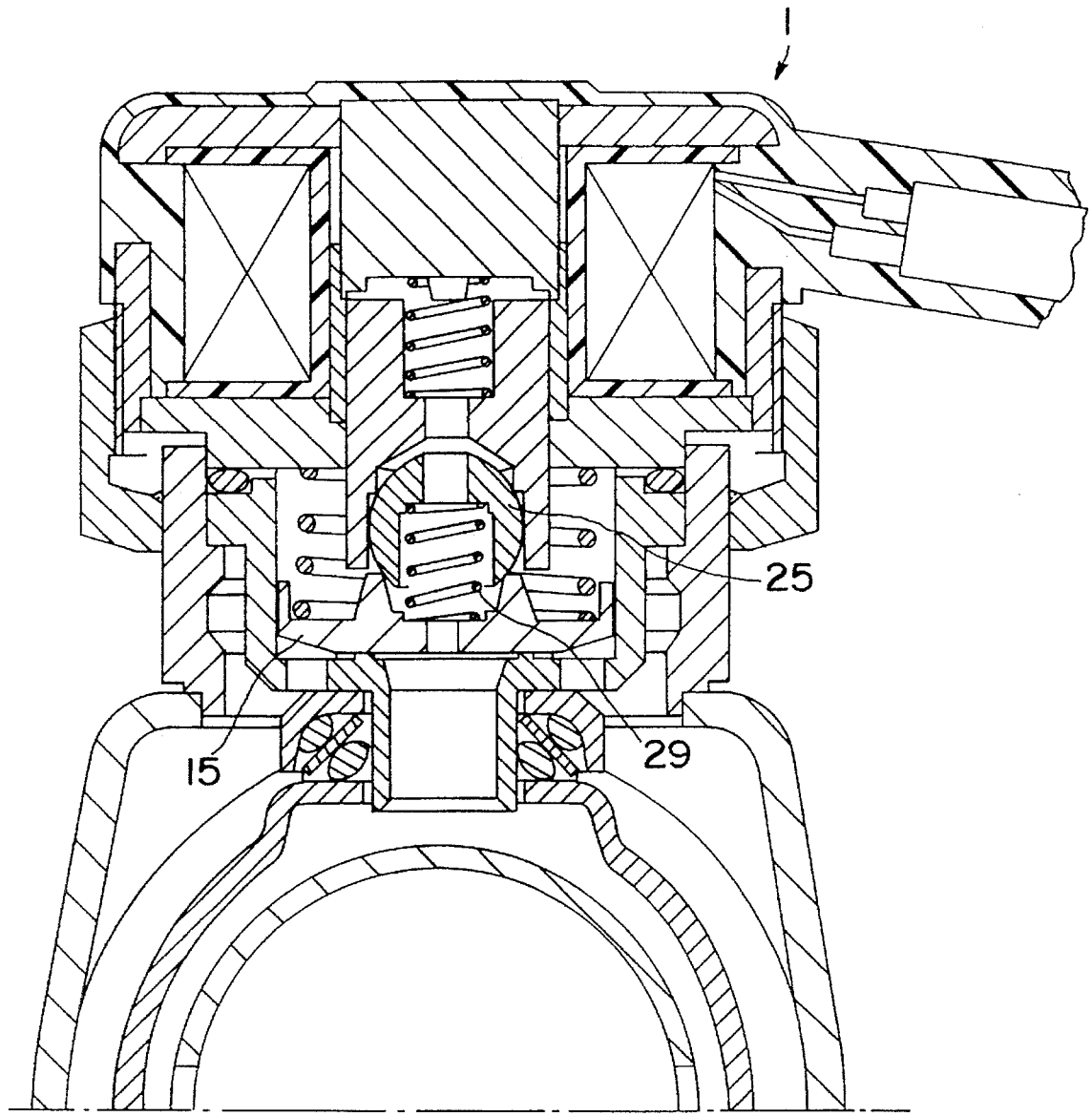
FIG. 4 shows the spring between a control chamber discharge valve body and a check valve body.

FIG. 4 illustrates a control chamber discharge valve body 25 which has a generally spherical shape, as shown. When this general configuration is used, a somewhat different problem may be encountered during assembly. After the check valve plate 15 has been inserted, with a conventional check valve module 1, the control chamber discharge valve body 25 would be centered only by means of the check valve plate 15. But on account of the spherical configuration of the control chamber discharge valve body 25, there is no assurance that the control chamber discharge valve body 25 will also be oriented vertically. If, however, a solution is adopted along the lines of that illustrated in FIGS. 2 and 3, in accordance with the present invention, these problems can essentially be safely eliminated.

Figure 4A:
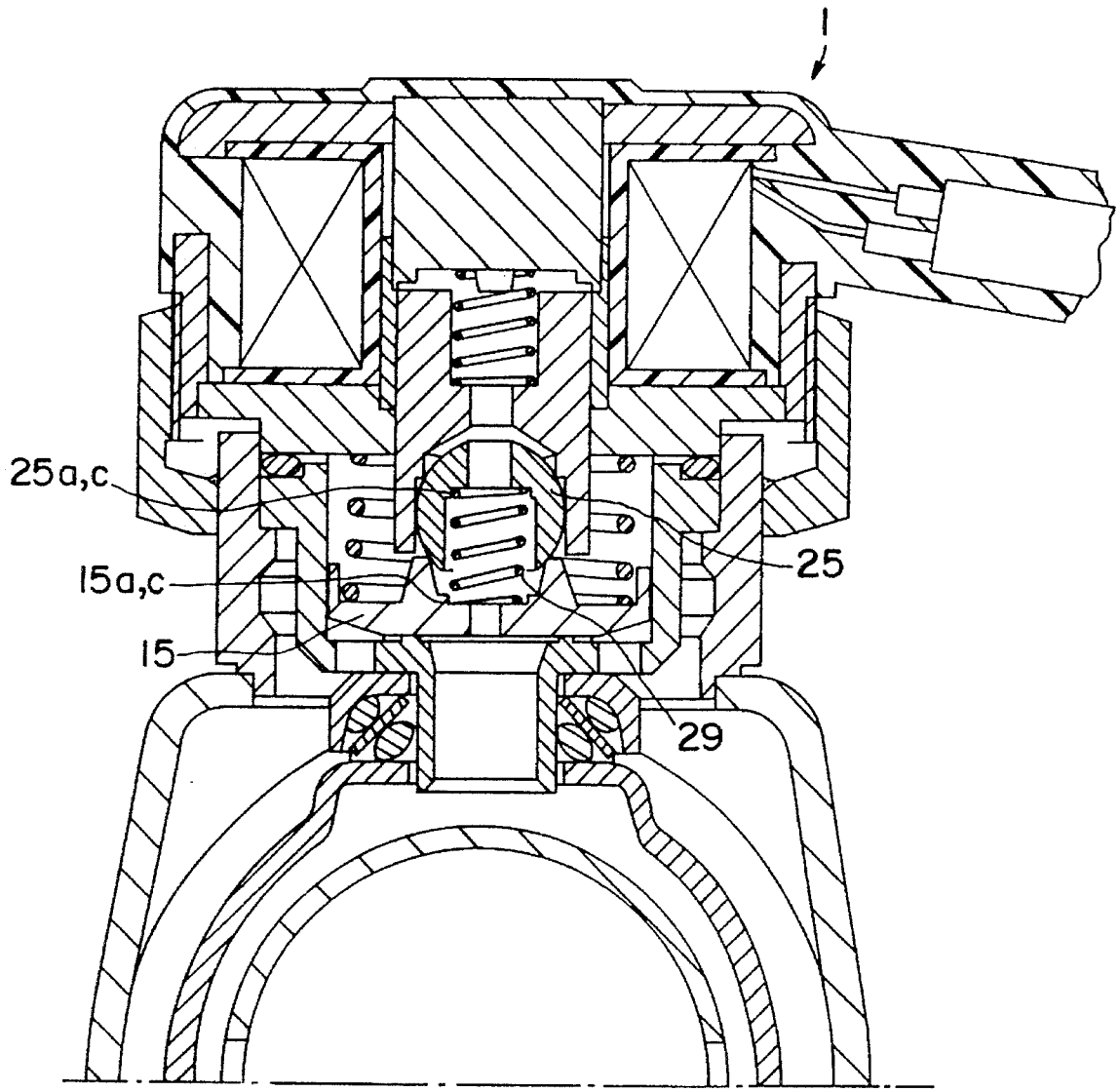
FIG. 4a is substantially the same view as FIG. 4, but more detailed.

FIG. 4a generally illustrates this type of solution. Particularly, spherical body 25 can have a surface 25a, similar to that shown in FIG. 2, to afford a force-fit of a terminal coil of spring 29. Accordingly, check valve plate 15 can have a similar surface 15a in order to afford a similar force-fit of the other terminal coil of spring 29. In the illustrated embodiment, such a surface 15a would essentially provide a force fit at the outer diameter of the terminal coil in question. Alternatively, check valve plate 15 could include an upwardly protruding annular portion, having a surface 15a, which would engage the inner diameter of the corresponding terminal coil, in a manner similar to that shown in FIG. 2 with respect to surface 27a.

Likewise, in an alternative embodiment, spherical body 25 can have a groove portion 25c, similar to that shown in FIG. 2, to afford a form-fit of a terminal coil of spring 29, wherein such a terminal coil would have an enlarged diameter in comparison with other coils. Accordingly, check valve plate 15 can preferably have a similar groove portion 15c in order to afford a similar form-fit of the other terminal coil of spring 29. In the illustrated embodiment, such a groove portion 15c would essentially accommodate a terminal coil having an enlarged diameter in comparison with other coils, in contrast to the terminal coil 35 of reduced diameter shown adjacent groove portion 27c in FIG. 3. Alternatively, check valve plate 15 could include an upwardly protruding annular portion, having a groove portion 15c, which would essentially accommodate a terminal coil 35 having a reduced diameter, in a manner similar to that shown in FIG. 3 with respect to groove portion 27c.

Figure 5:
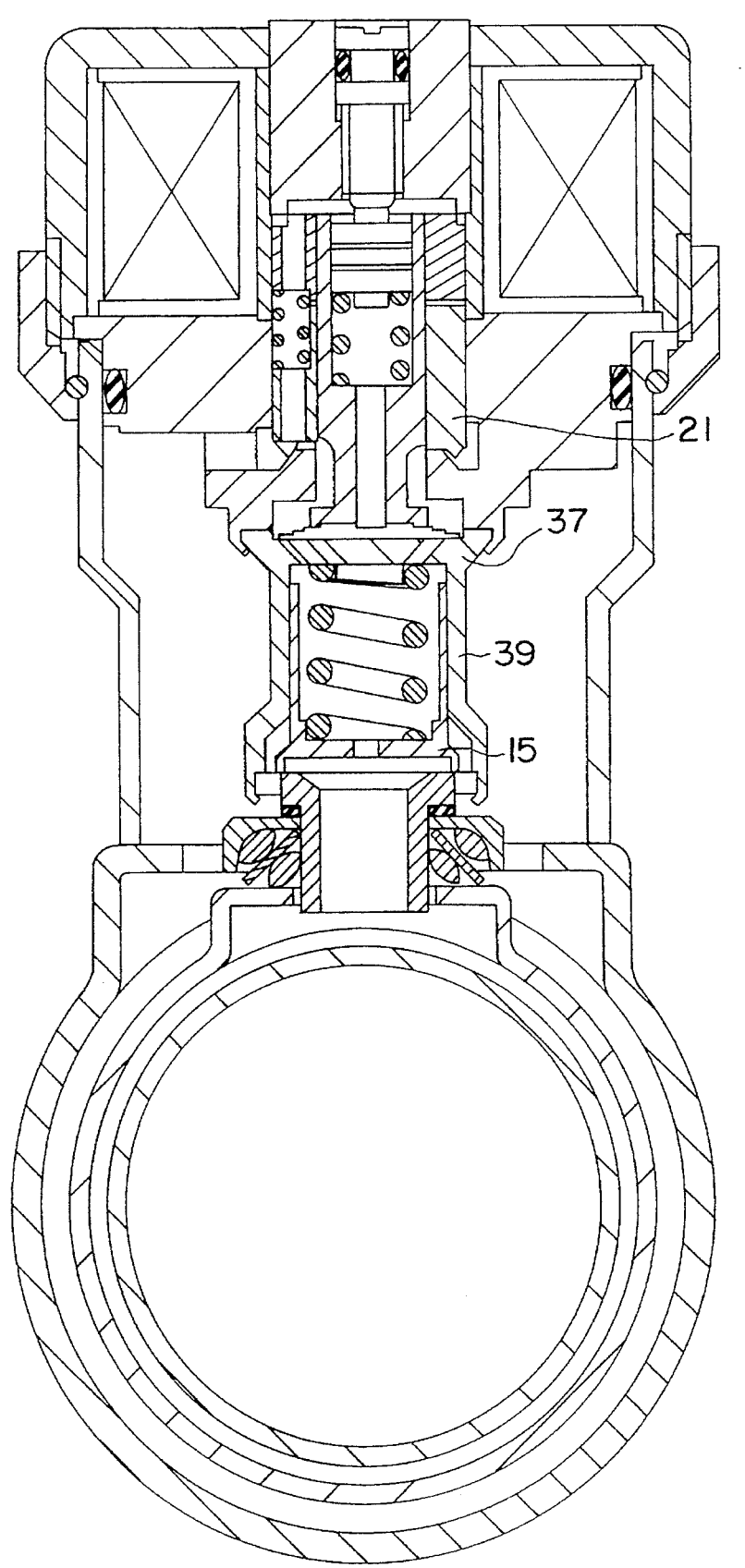
FIG. 5 shows the spring between a support surface inside the check valve module and the check valve body.

FIG. 5 illustrates an additional embodiment in which the spring 17 (see FIG. 5a) represents the closing spring for the check valve plate 15. As a result of the arrangement of the magnet armature 21 and of the spring 17 in a row, or series, the latter lies essentially deep inside the check valve module 1. The spring 17 can be supported on a surface 37 inside a guide bushing 39 of the housing. In this configuration of a check valve module 1, it can thus be appropriate to combine the spring 17 with the check valve plate 15 and the guide bushing 39 into a single component by means of a connection 17, 37a, 37c, 15a, 15c, in a manner analogous to that shown in FIGS. 2 and 3.

Figure 5A:
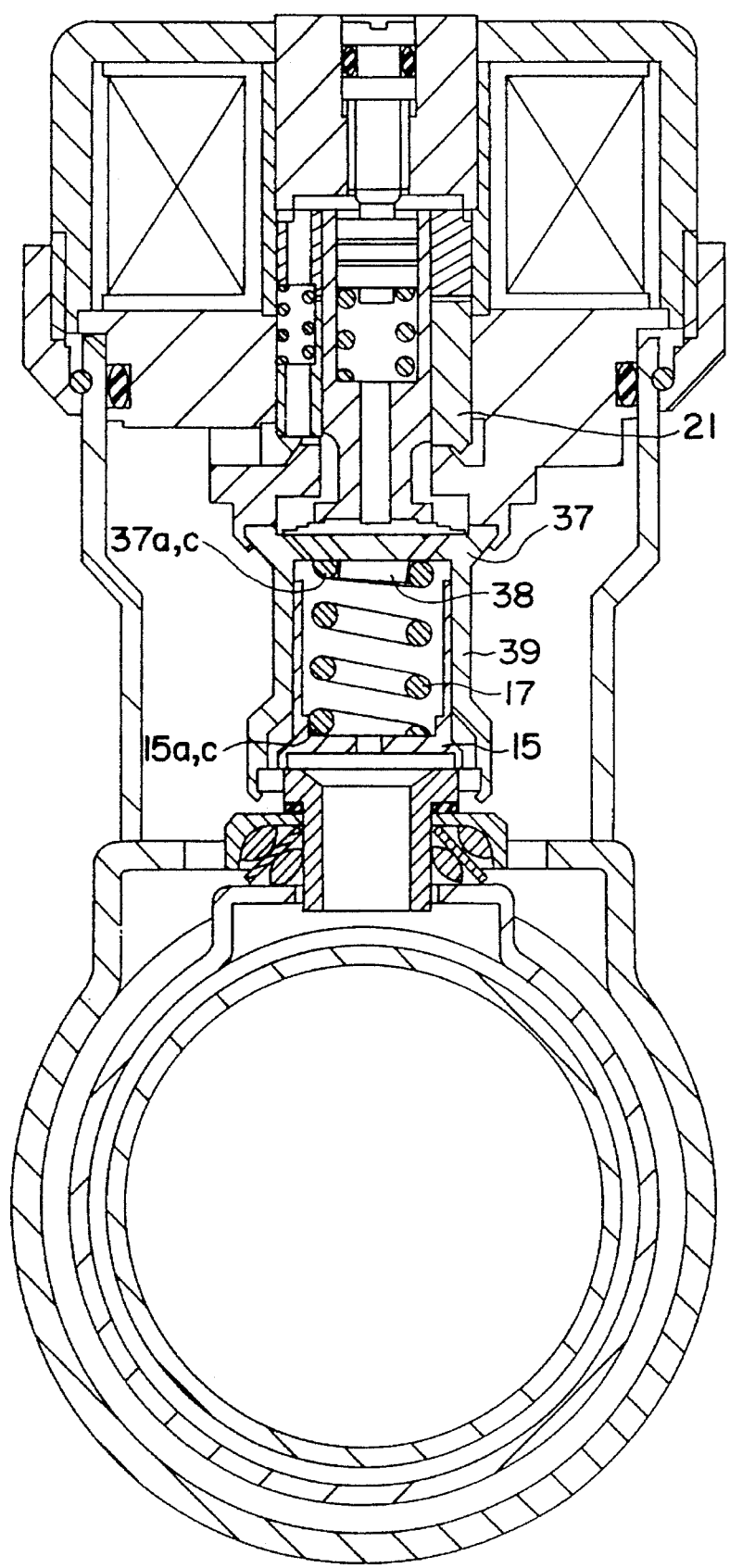
FIG. 5a is substantially the same view as FIG. 5, but more detailed.

Thus, FIG. 5a generally illustrates the manner in which spring 17, check valve plate 15 and guide bushing 39 can be combined into an integrated, pre-assembled component. Particularly, guide bushing 39 can have a surface 37a, similar to the surfaces 25a and 27a shown in FIG. 2, to afford a force-fit of a terminal coil of spring 17. To accomplish this, guide bushing 39 may have a disk-like downward protrusion 38 which would have such a surface 37a to engage with the inner diameter of a terminal coil of spring 17. Alternatively, bushing 39 may be shaped in such a manner as to have a surface 37a which is disposed along an interior wall portion of bushing 39. Accordingly, check valve plate 15 can have a similar surface 15a in order to afford a similar force-fit of the other terminal coil of spring 29. In the illustrated embodiment, such a surface 15a would essentially provide a force fit at the outer diameter of the terminal coil in question.

Likewise, in an alternative embodiment, downwardly protruding portion 38 can have a groove portion 37c, similar to groove portion 27c shown in FIG. 3, to afford a form-fit of a terminal coil of spring 17, wherein such a terminal coil would have a reduced diameter in comparison with other coils. Alternatively, bushing 39 may be shaped in such a manner as to have a groove portion 37c which, similar to the groove portion 25c in FIG. 3, is disposed along an interior wall portion of bushing 39. Accordingly, check valve plate 15 can have a similar groove portion 15c in order to afford a similar form-fit of the other terminal coil of spring 29. In the illustrated embodiment, such a groove portion 15c would essentially accommodate a terminal coil having an enlarged diameter in comparison with other coils.

Figure 6:
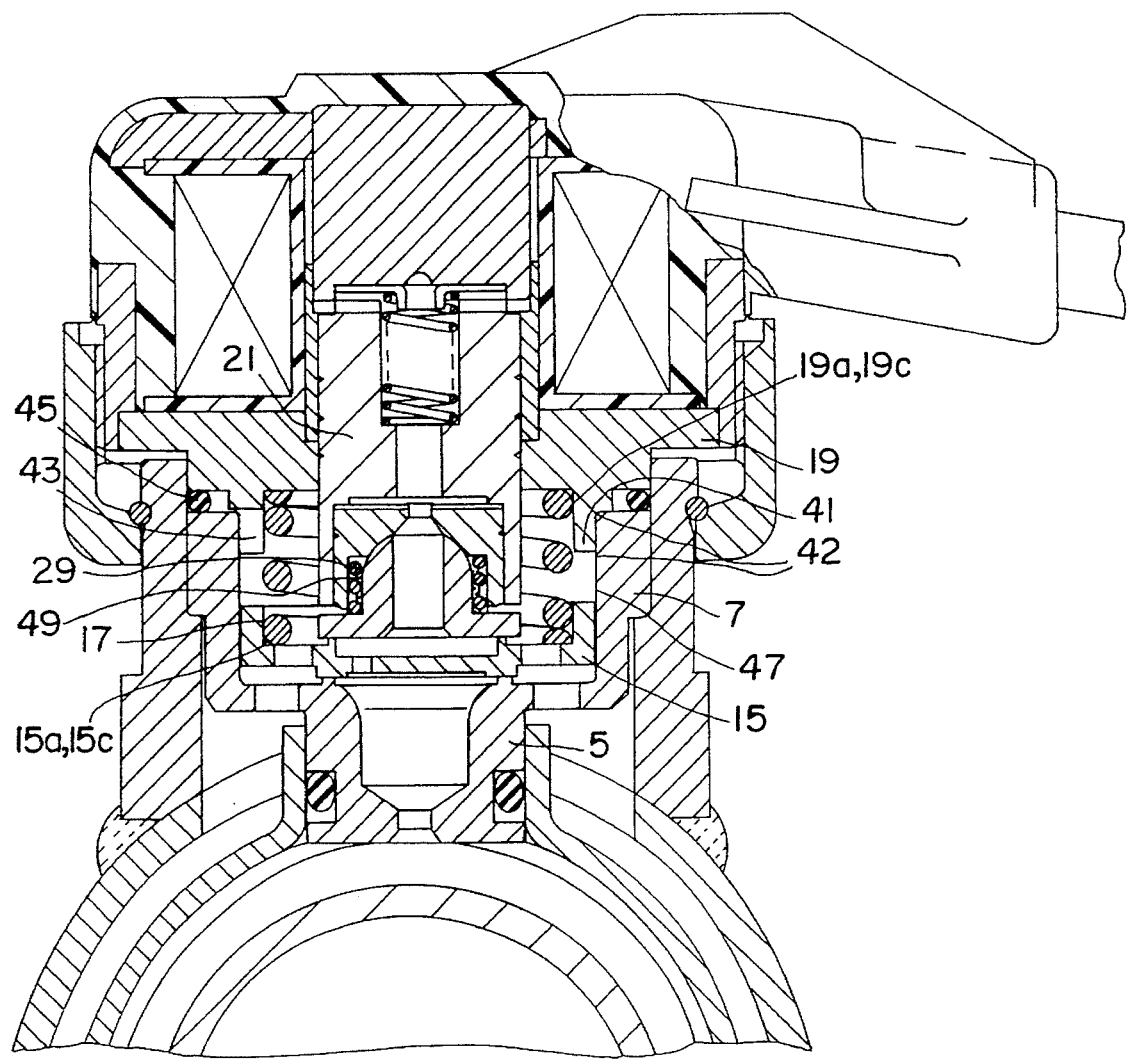
FIG. 6 shows the check valve module with a connection between pot and plate.

In the embodiment illustrated in FIG. 6, the housing-side plate 19 can have a guide 41 which forms a connection with the pot 7. The retention force of this connection 42 is greater than the combined spring forces of the coil spring 17, the spring 29 and the spring 51 (see FIG. 6a) for the armature 21. The guide 41 preferably has at least one opening 43 for an O-ring, or gasket, 45 between the plate 19 and the pot 7. The connection 42 can be formed by a force fit 47, but can also be formed by means of a weld 49.

Figure 6A:
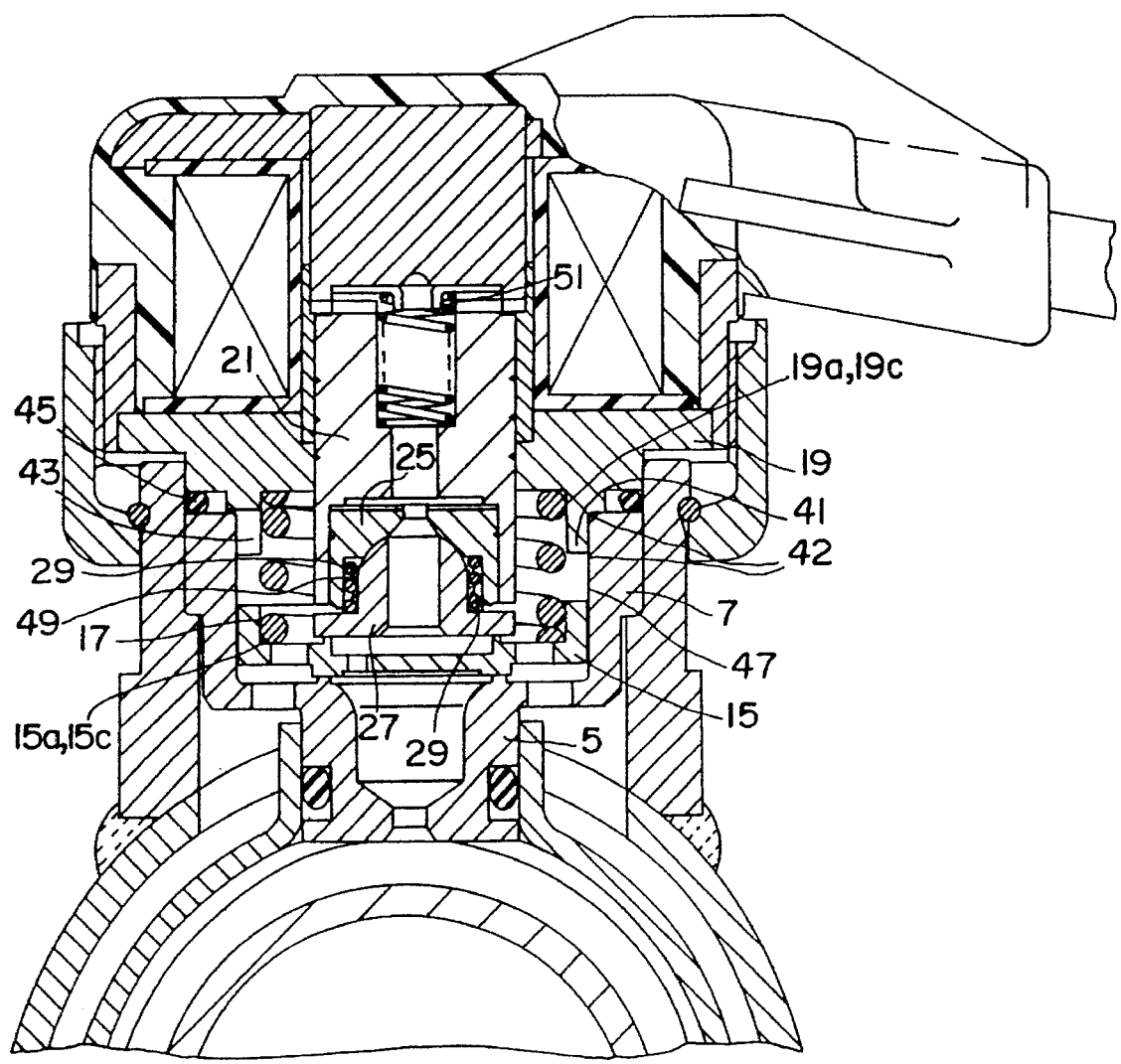
FIG. 6a is substantially the same view as FIG. 6, but more detailed.

Thus, as illustrated in FIGS. 6 and 6a, in accordance with a preferred embodiment of the present invention, housing-side plate 19 can have a guide 41, essentially in the form of an annular extension, which extends so as to be able to make contact, in a radial direction of the check valve, with pot 7. This radial contact is indicated as connection 42. Connection 432 can be formed by a force fit 47, a weld 49 or, conceivably, both.

If the housing of the check valve module is turned around, the housing can form an assembly jig into which the individual parts of the check valve module can be inserted. The pot 7 thus essentially "closes" the check valve module to form a separate module, which can then be very easily and reliably installed on the shock absorber, without this module falling apart.

In other words, in accordance with a preferred embodiment of the present invention, the housing of the check valve module, if turned around so as to essentially be in the form of an upward-facing receptacle, individual parts of the check valve can essentially very easily be inserted into the "receptacle". In this manner, installation of the pot 7 would essentially "close" the check valve module by essentially capping the opening of the receptacle, which would then allow easy and reliable installation on a shock absorber.

Between the spring 17 and the guide 41, and between the spring 17 and the check valve plate 15, a connection can preferably be achieved among components 17, 15a, 15c, 41a, 41c, in a manner analogous to that illustrated in FIGS. 2 and 3. In other words, in accordance with a preferred embodiment of the present invention, not only is it possible for bodies 25 and 27 to have the connections 25a/c and 27a/c with spring 29, as shown in FIGS. 2 and 3, but it is additionally possible for check valve plate 15 and guide 41 to have similar connections, in the form of force-fit connections 15a and 41a or form-fit connections 15c and 41c, with spring 17. Thus, there may conceivably be two sets of modular assemblies, one constituted by bodies 25 and 27 with spring 29, and the other constituted by check valve plate 15 and guide 41 with spring 17.

It will be appreciated that, if the check valve module has to be disassembled, the pot can be removed without the row of components inside the check valve module falling apart. In this respect, it will be noted that the connection 15a, 15c, 41a, 41c essentially holds all the individual parts together by means of the check valve plate 15.

One feature of the invention resides broadly in the shock absorber with adjustable damping force, comprising a cylinder, an axially movable piston rod with a piston connected to it, a number of fluid chambers with capacities which can be changed relative to one another as a function of the movement of the piston rod relative to the cylinder, and fluid connections between at least two of the fluid chambers, whereby at least one of the fluid connections has a check valve module, whereby the check valve module is further designed with at least one valve seat, whereby a valve check element can be elastically applied against the valve seat in a check position, whereby this valve check element can also be adjusted by means of a field coil in opposition to the closing force of at least one spring in a number of positions, whereby the spring(s) is/are a unit of a row inside the check valve module, and possibly an intermediate module, which consists of a control chamber discharge valve body and a supplemental discharge valve body, characterized by a connection 17, 29, 15a, 15c, 19a, 19c, 25a, 25c, 27a, 27c, 37a, 37c between any of the springs 29, 17 and inside the row of adjacent components of the spring(s), so that the adjacent parts form a pre-assembled unit, whereby the connection 17, 29, 15a, 15c, 19a, 19c, 25a, 25c, 27a, 27c, 37a, 37c can withstand a load which corresponds to the sum of the spring force and weight of the parts exerting a force on it.

Another feature of the invention resides broadly in the check valve module, characterized by the fact that a housing-side plate 19 has a guide 41 facing a pot 7, whereby the guide 41 is connected to the pot 7 so that the spring forces inside the row are less than the retention forces of the connection 42 between the cup 7 and the plate 19.

Yet another feature of the invention resides broadly in the check valve module, characterized by the fact that the springs 29, 17, by means of their inside and/or outside diameter, form a connection 17, 29, 15a, 15c, 19a, 19c, 25a, 25c, 27a, 27c, 37a, 37c to the adjacent parts.

Still another feature of the invention resides broadly in the check valve module, characterized by the fact that the connection 15a, 19a, 25a, 27a, 37a of the springs 17, 29 is a positive connection, and results from a force fit of the adjacent components 15, 19, 25, 27, 41.

Still another feature of the invention resides broadly in the check valve module, characterized by the fact that the connection 15c, 19c, 25c, 27c, 37c of the springs 17, 29 is a form-fitting connection, whereby the springs 17, 29 are locked in the vicinity of their terminal coils 35 to the adjacent components.

Another feature of the invention resides broadly in the check valve module, characterized by the fact that the terminal coils 35 of the springs 17, 29 of the assembly unit have a different coil diameter.

Yet another feature of the invention resides broadly in the check valve module, characterized by the fact that the spring 29 is located between the control chamber discharge valve body 25 and the supplemental discharge valve body 27.

Still another feature of the invention resides broadly in the check valve module, characterized by the fact that the spring 29 is located between the control chamber discharge valve body 25 and the check valve plate 15.

Another feature of the invention resides broadly in the check valve module, characterized by the fact that the connection 15a, 15c, 37a, 37c of the spring 17 is located between a support surface 37 of the housing inside the check valve module 1 and the check valve plate 15 and thereby represents the closing spring of the check valve plate 15.

Still another feature of the invention resides broadly in the check valve module, characterized by the fact that the guide 41 has a connection 15a, 15c, 19a, 19c by means of the closing spring 17 with the check valve plate 15, so that there is an assembly unit which comprises all the components of the row inside the check valve module, which correspond to the housing.

Yet another feature of the invention resides broadly in the check valve module, characterized by the fact that the retention forces of the connection 42 between the guide 41 on the housing-side plate 19 and the cup 7 are formed by a force fit.

Another feature of the invention resides broadly in the check valve module, characterized by the fact that the retention forces of the connection 42 between the guide 41 on the housing-side plate 19 and the cup 7 are absorbed by a welded connection.

Examples of check valve arrangements, and components associated therewith, which may be utilized in accordance with the embodiments of the present invention, may be found in the following U.S. Patents: U.S. Pat. No. 5,078,240, which issued to Ackermann et al. on Jan. 7, 1992; U.S. Pat. No. 4,482,036, which issued to Wossner et al. on Nov. 13, 1984; U.S. Pat. No. 4,287,970, which issued to Eusemann et al. on Sep. 8, 1981; and U.S. Pat. No. 4,105,041, which issued to Axthammer on Aug. 8, 1978.

Examples of electromagnetic valve arrangements with armatures, and associated components, which may be utilized in accordance with the embodiments of then present invention, may be found in the following U.S. Patents: U.S. Pat. No. 5,265,703, which issued to Ackermann on Nov. 30, 1993; U.S. Pat. No. 5,180,039, which issued to Axthammer et al. on Jan. 19, 1993; U.S. Pat. No. 4,899,996, which issued to Maassen et al. on Feb. 13, 1990; U.S. Pat. No. 4,850,460, which issued to Knecht et al. on Jul. 25, 1989; and U.S. Pat. No. 4,785,920, which issued to Knecht et al. on Nov. 22, 1988.

Examples of shock absorbers, and components associated therewith, which may be utilized in accordance with the embodiments of the present invention, may be found in the U.S. Patents listed above.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber comprising:

a cylinder defining a chamber therein, said cylinder containing a damping fluid;

a piston rod rod sealingly projecting into said cylinder and being axially displaceable with respect to said cylinder;

a piston being attached to said piston rod, said piston being slidably disposed within said cylinder to sealingly divide said chamber into first and second chambers;

means for permitting fluid communication between said first and second chambers;

said means for permitting fluid communication comprising check valve means, said check valve means having first aperture means and second aperture means, said check valve means being configured for transmitting fluid between said first aperture means and said second aperture means;

said check valve mean comprising:
a first body portion and a second body portion;
spring means for biasing said first body portion and said second body portion towards one another, said spring means having a first portion and a second portion;
said first portion of said spring means having means for being fixedly retained on said first body portion;
said second portion of said spring means having means for being fixedly retained on said second body portion;
first means, for fixedly retaining said first portion of said spring means on said first body portion;
second means, for fixedly retaining said second portion of said spring means on said second body portion;
said first retaining means and said second retaining means being configured to hold said first body portion, said second body portion and said spring means together as a modular, interchangeable unit during assembly of said shock absorber;

said first portion of said spring means has an inner diameter portion and an outer diameter portion, and said second portion of said spring means has an inner diameter portion and an outer diameter portion;

one of said inner diameter portion and said outer diameter portion of said first portion of said spring means is fixedly retained on said first body portion;

one of said inner diameter portion and said outer diameter portion of said second portion of said spring means is fixedly retained on said second body portion;

said first retaining means comprises one of:
means for providing a form fit between said first portion of said spring means and said first body portion to fixedly retain said first portion of said spring means on said first body portion; and
means for providing a force fit between said first portion of said spring means and said first body portion to fixedly retain said first portion of said spring means on said first body portion; said second retaining means comprises one of:
means for providing a form fit between said second portion of said spring means and said second body portion to fixedly retain said second portion of said spring means on said second body portion;
means for providing a force fit between said second portion of said spring means and said second body portion to fixedly retain said second portion of said spring means on said second body portion;

said spring means comprises a spring having a central longitudinal axis and two ends;

said spring comprises a plurality of contiguous coils, each of said coils describing about one revolution about said central longitudinal axis of said spring, said plurality of coils comprising a first terminal coil at a first end of said spring and a second terminal coil at a second end of said spring;

said first portion of said spring comprises said first terminal coil;

said second portion of said spring comprises said second terminal coil;

said check valve means comprises:
a seat;
said modular, interchangeable unit being disposed against said seat; and
means for permitting displacement of said modular, interchangeable unit away from said seat to promote fluid communication between said first aperture means and said second aperture means;

the means for permitting displacement of the modular, interchangeable unit away from the seat comprises:
armature means; and
electromagnetic means for activating the armature means to permit displacement of the modular, interchangeable unit away from the seat;

the first body portion comprises a control chamber discharge valve body;

the second body portion comprises a supplemental discharge valve body;

the supplemental discharge valve body is for being disposed against the seat on the check valve plate;

the control chamber discharge valve body has an interior surface;

the interior surface of the control chamber discharge valve body has a first cylindrical portion and a second cylindrical portion;

the first cylindrical portion is configured to be out of contact with the spring;

the supplemental discharge valve body has an outer surface;

the outer surface of the control chamber discharge body has a first portion and a second portion, the second portion being generally cylindrical;

the first portion of the outer surface is configured to be out of contact with the spring; and the check valve means further comprises:
the coils of the spring being of generally constant diameter;
the first retaining means comprising first means for providing a force fit between the first portion of the spring and the control chamber discharge valve body;
the first means for providing a force fit comprising:
the second cylindrical portion having a smaller diameter than the first cylindrical portion;
the second cylindrical portion having an axial dimension configured such that the outer diameter portion of only the first terminal coil of the spring is graspingly engaged by the second cylindrical portion, to provide a force fit of the first terminal coil of the spring with respect to the control chamber discharge valve body; and
the interior surface of the control chamber discharge valve body further having a frustoconical transition portion between the first cylindrical portion and the second cylindrical portion; and
the second retaining means comprising second means for providing a force fit between the second portion of the spring and the supplemental discharge valve body; and
the second means for providing a force fit comprising:
the second portion of the outer surface having a larger diameter than the first portion;

the second portion of the outer surface having an axial dimension configured such that the inner diameter portion of only the second terminal coil of the spring is graspingly engaged by the second cylindrical portion, to provide a force fit of the second terminal coil of the spring with respect to the supplemental discharge valve body; and the outer surface of the supplemental discharge valve body further having a frustoconical transition portion between the first cylindrical portion and the second cylindrical portion.

2. The shock absorber according to claim 1, further comprising:

means for housing the modular, interchangeable unit;

said means for housing the modular, interchangeable unit comprising:

plate means, the plate means comprising a plate and a peripheral wall portion extending from the plate;

cup means, the cup means having a wall portion for interfacing with the wall portion of the plate means;

the wall portion of the plate means being interfaced with the wall portion of the cup means;

the plate means and the cup means being fixedly retained with respect to one another to define a chamber therewithin;

a check valve plate, wherein the check valve plate includes the seat against which the modular, interchangeable unit is disposed;

an additional spring for biasing the cup means and the check valve plate apart from one another;

the modular, interchangeable unit constituted by the first body portion, the second body portion and the spring being disposed within the chamber;

the interface between the wall portion of the plate means and the wall portion of the cup means being configured such that the sum of:

the biasing force of the cup means and the plate means with respect to one another; and the biasing force of the first body portion and the second body portion with respect to one another is less than the force required to fixedly retain the plate means and the cup means with respect to one another; the check valve means further comprises:

the additional spring having a central longitudinal axis and two ends;

the additional spring having a plurality of coils, each of the coils describing about one revolution about the central longitudinal axis of the spring, the plurality of coils comprising a first terminal coil at a first end of the additional spring and a second terminal coil at a second end of the additional spring;

the first and second terminal coils each having an inner diameter portion and an outer diameter portion;

the check valve plate having an annular protrusion extending generally towards the plate means;

third means, for fixedly retaining the first terminal coil of the additional spring on the wall portion of the plate means;

fourth means, for fixedly retaining the second terminal coil of the additional spring on the annular protrusion of the check valve plate;

the third retaining and the fourth retaining means being configured for holding the plate means, the check valve plate and the additional spring together as a modular, pre-assembled, interchangeable unit during assembly of the shock absorber; and the interface between the wall portion of the cup means and the wall portion of the plate means is provided by at least one of:

a weld between the wall portion of the cup means and the wall portion of the plate means; and a force fit between the wall portion of the cup means and the wall portion of the plate means.

3. The shock absorber according to claim 2, wherein:

the check valve means further comprises:

the coils of the additional spring being of generally constant diameter;

the third retaining means comprising means for providing a force fit between the first terminal coil of the additional spring and the wall portion of the plate means, wherein the wall portion of the plate means has an inner diameter configured such that the outer diameter portion of the first terminal coil of the additional spring is graspingly engaged by the wall portion, to provide a force fit of the first terminal coil of the additional spring with respect to the plate means; and the fourth retaining means comprising means for providing a force fit between the second terminal coil of the additional spring and the annular protrusion of the check valve plate, wherein the annular protrusion of the check valve plate has an inner diameter configured such that the outer diameter portion of the second terminal coil of the additional spring is graspingly engaged by the annular protrusion of the check valve plate.

4. The shock absorber according to claim 2, wherein:

the check valve means further comprises:

the first terminal coil of the additional spring and the second terminal coil of the additional spring both have a larger diameter than all the other coils of the spring;

the third retaining means comprises means for providing a form fit between the first terminal coil of the additional spring and the wall portion of the plate means, wherein the wall portion of the plate means comprises an indented annular groove for accommodating the first terminal coil of the additional spring therewithin to provide the form fit; and the fourth retaining means comprises means for providing a form fit between the second terminal coil of the additional spring and the annular protrusion of the check valve plate, wherein the annular protrusion of the check valve plate comprises an indented annular groove for accommodating the second terminal coil of the additional spring therewithin to provide the form fit.

5. A shock absorber comprising:

a cylinder defining a chamber therein, said cylinder containing a damping fluid;

a piston rod rod sealingly projecting into said cylinder and being axially displaceable with respect to said cylinder;

a piston being attached to said piston rod, said piston being slidably disposed within said cylinder to sealingly divide said chamber into first and second chambers;

means for permitting fluid communication between said first and second chambers;

said means for permitting fluid communication comprising check valve means, said check valve means having first aperture means and second aperture means, said check valve means being configured for transmitting fluid between said first aperture means and said second aperture means;

said check valve means comprising:
a first body portion and a second body portion;
spring means for biasing said first body portion and said second body portion towards one another, said spring means having a first portion and a second portion;
said first portion of said spring means having means for being fixedly retained on said first body portion;
said second portion of said spring means having means for being fixedly retained on said second body portion;
first means, for fixedly retaining said first portion of said spring means on said first body portion;
second means, for fixedly retaining said second portion of said spring means on said second body portion;
said first retaining means and said second retaining means being configured to hold said first body portion, said second body portion and said spring means together as a modular, interchangeable unit during assembly of said shock absorber;
said first portion of said spring means has an inner diameter portion and an outer diameter portion, and said second portion of said spring means has an inner diameter portion and an outer diameter portion;
one of said inner diameter portion and said outer diameter portion of said first portion of said spring means is fixedly retained on said first body portion;
one of said inner diameter portion and said outer diameter portion of said second portion of said spring means is fixedly retained on said second body portion;
said first retaining means comprises one of:
means for providing a form fit between said first portion of said spring means and said first body portion to fixedly retain said first portion of said spring means on said first body portion; and
means for providing a force fit between said first portion of said spring means and said first body portion to fixedly retain said first portion of said spring means on said first body portion; said second retaining means comprises one of:
means for providing a form fit between said second portion of said spring means and said second body portion to fixedly retain said second portion of said spring means on said second body portions;
means for providing a force fit between said second portion of said spring means and said second body portion to fixedly retain said second portion of said spring means on said second body portion;
said spring means comprises a spring having a central longitudinal axis and two ends;
said spring comprises a plurality of contiguous coils, each of said coils describing about one revolution about said central longitudinal axis of said spring, said plurality of coils comprising a first terminal coil at a first end of said spring and a second terminal coil at a second end of said spring;
said first portion of said spring comprises said first terminal coil;
said second portion of said spring comprises said second terminal coil;
said check valve means comprises:
a seat;

said modular, interchangeable unit being disposed against said seat; and
means for permitting displacement of said modular, interchangeable unit away from said seat to promote fluid communication between said first aperture means and said second aperture means;
the means for permitting displacement of the modular, interchangeable unit away from the seat comprises:
armature means; and
electromagnetic means for activating the armature means to permit displacement of the modular, interchangeable unit away from the seat;
the first body portion comprises a control chamber discharge valve body;
the second body portion comprises a supplemental discharge valve body;
the supplemental discharge valve body is for being disposed against the seat on the check valve plate;
the control chamber discharge valve body has an interior surface;
the interior surface of the control chamber discharge valve body has a first cylindrical portion and a second cylindrical portion;
the first cylindrical portion is configured to be out of contact with the spring;
the supplemental discharge valve body has an outer surface;
the outer surface of the control chamber discharge body has a first portion and a second portion, the second portion being generally cylindrical;
the first portion of the outer surface is configured to be out of contact with the spring; and
the check valve further comprises:
the first terminal coil of the spring having a larger diameter than all the other coils of the spring;
the second terminal coil of the spring having a smaller diameter than all the other coils of the spring;
the first retaining means comprising first means for providing a form fit between the first portion of the spring and the control chamber discharge valve body;
the first means for providing a form fit comprising:
the second cylindrical portion having a greater diameter than the first cylindrical portion;
the second cylindrical portion having an axial dimension configured such that the outer diameter portion of only the first terminal coil of the spring is accommodated within the second cylindrical portion, to provide a form fit of the first terminal coil of the spring with respect to the control chamber discharge valve body;
the second cylindrical portion being in the form of an annular groove; and
the interior surface of the control chamber discharge valve body having a direct, stepped transition between the first cylindrical portion and the second cylindrical portion; and
the second retaining means comprising second means for providing a form fit between the second portion of the spring and the supplemental discharge valve body; and
the second means for providing a form fit comprising:
the second portion of the outer surface having a smaller diameter than the first portion;
the second portion of the outer surface having an axial dimension configured such that the inner diameter portion of only the second terminal coil of the spring is accommodated in the second cylindrical portion, to provide a form fit of the second terminal coil of the spring with respect to the supplemental discharge valve body; and the second portion of the outer surface is generally in the form of an annular groove.

6. The shock absorber according to claim 5, further comprising:

means for housing the modular, interchangeable unit;

said means for housing the modular, interchangeable unit comprising:

plate means, the plate means comprising a plate and a peripheral wall portion extending from the plate;

cup means, the cup means having a wall portion for interfacing with the wall portion of the plate means;

the wall portion of the plate means being interfaced with the wall portion of the cup means;

the plate means and the cup means being fixedly retained with respect to one another to define a chamber therewithin;

a check valve plate, wherein the check valve plate includes the seat against which the modular, interchangeable unit is disposed;

an additional spring for biasing the cup means and the check valve plate apart from one another;

the modular, interchangeable unit constituted by the first body portion, the second body portion and the spring being disposed within the chamber;

the interface between the wall portion of the plate means and the wall portion of the cup means being configured such that the sum of:

the biasing force of the cup means and the plate means with respect to one another; and the biasing force of the first body portion and the second body portion with respect to one another is less than the force required to fixedly retain the plate means and the cup means with respect to one another; the check valve means further comprises:

the additional spring having a central longitudinal axis and two ends;

the additional spring having a plurality of coils, each of the coils describing about one revolution about the central longitudinal axis of the spring, the plurality of coils comprising a first terminal coil at a first end of the additional spring and a second terminal coil at a second end of the additional spring;

the first and second terminal coils each having an inner diameter portion and an outer diameter portion;

the check valve plate having an annular protrusion extending generally towards the plate means;

third means, for fixedly retaining the first terminal coil of the additional spring on the wall portion of the plate means;

fourth means, for fixedly retaining the second terminal coil of the additional spring on the annular protrusion of the check valve plate;

the third retaining and the fourth retaining means being configured for holding the plate means, the check valve plate and the additional spring together as a modular, pre-assembled, interchangeable unit during assembly of the shock absorber; and the interface between the wall portion of the cup means and the wall portion of the plate means is provided by at least one of:

a weld between the wall portion of the cup means and the wall portion of the plate means; and a force fit between the wall portion of the cup means and the wall portion of the plate means.

7. The shock absorber according to claim 6, wherein:

the check valve means further comprises:

the coils of the additional spring being of generally constant diameter;

the third retaining means comprising means for providing a force fit between the first terminal coil of the additional spring and the wall portion of the plate means, wherein the wall portion of the plate means has an inner diameter configured such that the outer diameter portion of the first terminal coil of the additional spring is graspingly engaged by the wall portion, to provide a force fit of the first terminal coil of the additional spring with respect to the plate means; and the fourth retaining means comprising means for providing a force fit between the second terminal coil of the additional spring and the annular protrusion of the check valve plate, wherein the annular protrusion of the check valve plate has an inner diameter configured such that the outer diameter portion of the second terminal coil of the additional spring is graspingly engaged by the annular protrusion of the check valve plate.

8. The shock absorber according to claim 6, wherein:

the check valve means further comprises:

the first terminal coil of the additional spring and the second terminal coil of the additional spring both have a larger diameter than all the other coils of the spring;

the third retaining means comprises means for providing a form fit between the first terminal coil of the additional spring and the wall portion of the plate means, wherein the wall portion of the plate means comprises an indented annular groove for accommodating the first terminal coil of the additional spring therewithin to provide the form fit; and the fourth retaining means comprises means for providing a form fit between the second terminal coil of the additional spring and the annular protrusion of the check valve plate, wherein the annular protrusion of the check valve plate comprises an indented annular groove for accommodating the second terminal coil of the additional spring therewithin to provide the form fit.

9. A shock absorber comprising:

a cylinder defining a chamber therein, said cylinder containing a damping fluid;

a piston rod rod sealingly projecting into said cylinder and being axially displaceable with respect to said cylinder;

a piston being attached to said piston rod, said piston being slidably disposed within said cylinder to sealingly divide said chamber into first and second chambers;

means for permitting fluid communication between said first and second chambers;

said means for permitting fluid communication comprising check valve means, said check valve means having first aperture means and second aperture means, said check valve means being configured for transmitting fluid between said first aperture means and said second aperture means;

said check valve means comprising:

a first body portion and a second body portion;

spring means for biasing said first body portion and said second body portion towards one another, said spring means having a first portion and a second portion;

said first portion of said spring means having means for being fixedly retained on said first body portion;

said second portion of said spring means having means for being fixedly retained on said second body portion;

first means, for fixedly retaining said first portion of said spring means on said first body portion;

second means, for fixedly retaining said second portion of said spring means on said second body portion;

said first retaining means and said second retaining means being configured to hold said first body portion, said second body portion and said spring means together as a modular, interchangeable unit during assembly of said shock absorber;

said first portion of said spring means has an inner diameter portion and an outer diameter portion, and said second portion of said spring means has an inner diameter portion and an outer diameter portion;

one of said inner diameter portion and said outer diameter portion of said first portion of said spring means is fixedly retained on said first body portion;

one of said inner diameter portion and said outer diameter portion of said second portion of said spring means is fixedly retained on said second body portion;

said first retaining means comprises one of:
means for providing a form fit between said first portion of said spring means and said first body portion to fixedly retain said first portion of said spring means on said first body portion; and
means for providing a force fit between said first portion of said spring means and said first body portion to fixedly retain said first portion of said spring means on said first body portion; said second retaining means comprises one of:
means for providing a form fit between said second portion of said spring means and said second body portion to fixedly retain said second portion of said spring means on said second body portion;
means for providing a force fit between said second portion of said spring means and said second body portion to fixedly retain said second portion of said spring means on said second body portion;

said spring means comprises a spring having a central longitudinal axis and two ends;

said spring comprises a plurality of contiguous coils, each of said coils describing about one revolution about said central longitudinal axis of said spring, said plurality of coils comprising a first terminal coil at a first end of said spring and a second terminal coil at a second end of said spring;

said first portion of said spring comprises said first terminal coil;

said second portion of said spring comprises said second terminal coil;

said check valve means comprises:
a seat;
said modular, interchangeable unit being disposed against said seat; and
means for permitting displacement of said modular, interchangeable unit away from said seat to promote fluid communication between said first aperture means and said second aperture means;

the means for permitting displacement of the modular, interchangeable unit away from the seat comprises:
armature means; and
electromagnetic means for activating the armature means to permit displacement of the modular, interchangeable unit away from the seat;

the first body portion comprises a control chamber discharge valve body, the control chamber discharge valve body being generally spherical;

the second body portion comprises a check valve plate;

the check valve plate is for being disposed against the seat;

the control chamber discharge valve body has an interior surface;

the interior surface of the control chamber discharge valve body has a first portion and a second portion;

the first portion of the interior surface is configured to be out of contact with the spring;

the check valve plate has an annular protrusion extending therefrom towards the control chamber discharge valve body;

the check valve means further comprises:
the coils of the spring being of generally constant diameter;
the first retaining means comprising first means for providing a force fit between the first portion of the spring and the control chamber discharge valve body;
the first means for providing a force fit comprising:
the second portion of the interior surface having a smaller diameter than the first portion;
the second portion of the interior surface having an axial dimension configured such that the outer diameter portion of only the first terminal coil of the spring is graspingly engaged by the second portion of the interior surface, to provide a force fit of the first terminal coil of the spring with respect to the control chamber discharge valve body; and
the interior surface further having a frustoconical transition portion between the first cylindrical portion and the second cylindrical portion; and
the second means for providing a force fit comprising:
the annular protrusion of the check valve plate having an inner diameter configured such that the outer diameter portion of only the second terminal coil of the spring is graspingly engaged by the annular protrusion, to provide a force fit of the second terminal coil of the spring with respect to the check valve plate.

10. A shock absorber comprising:

a cylinder defining a chamber therein, said cylinder containing a damping fluid;

a piston rod rod sealingly projecting into said cylinder and being axially displaceable with respect to said cylinder;

a piston being attached to said piston rod, said piston being slidably disposed within said cylinder to sealingly divide said chamber into first and second chambers;

means for permitting fluid communication between said first and second chambers;

said means for permitting fluid communication comprising check valve means, said check valve means having first aperture means and second aperture means, said check valve means being configured for transmitting fluid between said first aperture means and said second aperture means;

said check valve means comprising:
a first body portion and a second body portion;
spring means for biasing said first body portion and said second body portion towards one another, said spring means having a first portion and a second portion;
said first portion of said spring means having means for being fixedly retained on said first body portion;
said second portion of said spring means having means for being fixedly retained oil said second body portion;
first means, for fixedly retaining said first portion of said spring means on said first body portion;
second means, for fixedly retaining said second portion of said spring means on said second body portion;
said first retaining means and said second retaining means being configured to hold said first body portion, said second body portion and said spring means together as a modular, interchangeable unit during assembly of said shock absorber;

said first portion of said spring means has an inner diameter portion and an outer diameter portion, and said second portion of said spring means has an inner diameter portion and an outer diameter portion;

one of said inner diameter portion and said outer diameter portion of said first portion of said spring means is fixedly retained on said first body portion;

one of said inner diameter portion and said outer diameter portion of said second portion of said spring means is fixedly retained on said second body portion;

said first retaining means comprises one of:
means for providing a form fit between said first portion of said spring means and said first body portion to fixedly retain said first portion of said spring means on said first body portion; and
means for providing a force fit between said first portion of said spring means and said first body portion to fixedly retain said first portion of said spring means on said first body portion;

said second retaining means comprises one of:
means for providing a form fit between said second portion of said spring means and said second body portion to fixedly retain said second portion of said spring means on said second body portion;
means for providing a force fit between said second portion of said spring means and said second body portion to fixedly retain said second portion of said spring means on said second body portion;

said spring means comprises a spring having a central longitudinal axis and two ends;

said spring comprises a plurality of contiguous coils, each of said coils describing about one revolution about said central longitudinal axis of said spring, said plurality of coils comprising a first terminal coil at a first end of said spring and a second terminal coil at a second end of said spring;

said first portion of said spring comprises said first terminal coil;

said second portion of said spring comprises said second terminal coil;

said check valve means comprises:
a seat;
said modular, interchangeable unit being disposed against said seat; and
means for permitting displacement of said modular, interchangeable unit away from said seat to promote fluid communication between said first aperture means and said second aperture means;

the means for permitting displacement of the modular, interchangeable unit away from the seat comprises:
armature means; and
electromagnetic means for activating the armature means to permit displacement of the modular, interchangeable unit away from the seat;

the first body portion comprises a control chamber discharge valve body, the control chamber discharge valve body being generally spherical;

the second body portion comprises a check valve plate;

the check valve plate is for being disposed against the seat;

the control chamber discharge valve body has an interior surface;

the interior surface of the control chamber discharge valve body has a first portion and a second portion;

the first portion of the interior surface is configured to be out of contact with the spring;

the check valve plate has an annular protrusion extending therefrom towards the control chamber discharge valve body;

the check valve means further comprises:
the first terminal coil of the spring and the second terminal coil of the spring both having larger diameters than all the other coils of the spring;
the first retaining means comprising first means for providing a form fit between the first portion of the spring and the control chamber discharge valve body;
the first means for providing a form fit comprising:
the second portion of the interior surface having a greater diameter than the first portion of the interior surface;
the second portion of the interior surface having an axial dimension configured such that the outer diameter portion of only the first terminal coil of the spring is accommodated within the second portion of the interior surface, to provide a form fit of the first terminal coil of the spring with respect to the control chamber discharge valve body;
the second portion of the interior surface being in the form of an annular groove; and
the interior surface of the control chamber discharge valve body having a direct, stepped transitions between the first cylindrical portion and the second cylindrical portion; and
the second retaining means comprising second means for providing a form fit between the second portion of the spring and the check valve plate.

11. A shock absorber comprising:
a cylinder defining a chamber therein, said cylinder containing a damping fluid;
a piston rod rod sealingly projecting into said cylinder and being axially displaceable with respect to said cylinder;
a piston being attached to said piston rod, said piston being slidably disposed within said cylinder to sealingly divide said chamber into first and second chambers;

means for permitting fluid communication between said first and second chambers;

said means for permitting fluid communication comprising check valve means, said check valve means having first aperture means and second aperture means, said check valve means being configured for transmitting fluid between said first aperture means and said second aperture means;

said check valve means comprising:
a first body portion and a second body portion
spring means for biasing said first body portion and said second body portion towards one another said spring means having a first portion and a second portion;
said first portion of said spring means having means for being fixedly retained on said first body portion;
said second portion of said spring means having means for being fixedly retained on said second body portion;
first means, for fixedly retaining said first portion of said spring means on said first body portion;
second means, for fixedly retaining said second portion of said spring means on said second body portion;
said first retaining means and said second retaining means being configured to hold said first body portion, said second body portion and said spring means together as a modular, interchangeable unit during assembly of said shock absorber;

said first portion of said spring means has an inner diameter portion and an outer diameter portion, and said second portion of said spring means has an inner diameter portion and an outer diameter portion;

one of said inner diameter portion and said outer diameter portion of said first portion of said spring means is fixedly retained on said first body portion;

one of said inner diameter portion and said outer diameter portion of said second portion of said spring means is fixedly retained on said second body portion;

said first retaining means comprises one of:
means for providing a form fit between said first portion of said spring means and said first body portion to fixedly retain said first portion of said spring means on said first body portion; and
means for providing a force fit between said first portion of said spring means and said first body portion to fixedly retain said first portion of said spring means on said first body portion; said second retaining means comprises one of:
means for providing a form fit between said second portion of said spring means and said second body portion to fixedly retain said second portion of said spring means on said second body portion;
means for providing a force fit between said second portion of said spring means and said second body portion to fixedly retain said second portion of said spring means on said second body portion;

said spring means comprises a spring having a central longitudinal axis and two ends;

said spring comprises a plurality of contiguous coils, each of said coils describing about one revolution about said central longitudinal axis of said spring, said plurality of coils comprising a first terminal coil at a first end of said spring and a second terminal coil at a second end of said spring;

said first portion of said spring comprises said first terminal coil;

said second portion of said spring comprises said second terminal coil;

said check valve means comprises:
a seat;
said modular, interchangeable unit being disposed against said seat; and
means for permitting displacement of said modular, interchangeable unit away from said seat to promote fluid communication between said first aperture means and said second aperture means;

the means for permitting displacement of the modular, interchangeable unit away from the seat comprises:
armature means; and
electromagnetic means for activating the armature means to permit displacement of the modular, interchangeable unit away from the seat;

the first body portion comprises a guide bushing, the guide bushing being generally cylindrical and having an interior surface;

the interior surface of the guide bushing being generally cylindrical;

the second body portion comprises a check valve plate;

the check valve plate is for being disposed against the seat;

the interior surface of the guide bushing is configured to be out of contact with the spring;

the guide bushing has a disk-like protrusion extending therefrom towards the check valve plate;

the check valve plate has an annular protrusion extending therefrom towards the guide bushing;

the annular protrusion of the check valve plate being generally cylindrical and being configured for engaging slidingly with the interior surface of the guide bushing, wherein the annular protrusion of the check valve plate and the interior surface of the guide bushing define a chamber therewithin, the spring being disposed inside the chamber;

the annular protrusion of the check valve plate having a first interior cylindrical surface portion and a second interior cylindrical surface portion;

the first interior cylindrical surface portion is configured to be out of contact with the spring;

the check valve means further comprises:
the coils of the spring being of generally constant diameter;
the first retaining means comprising means for providing a force fit between the first portion of the spring and the guide bushing, wherein the disk-like for graspingly engaging the inner diameter portion of the first terminal coil of the spring, to provide a force fit of the first terminal coil of the spring with respect to the guide bushing;
the second retaining means comprising second means for providing a force fit between the second portion of the spring and the check valve plate;
the second means for providing a force fit comprising:
the second interior cylindrical surface portion having a smaller diameter than the first interior cylindrical surface portion;
the second interior cylindrical surface portion having an axial dimension configured such that the outer diameter portion of the second terminal coil of the spring is graspingly engaged by the second interior cylindrical surface portion, to provide a force fit of the second terminal coil of the spring with respect to the check valve plate; and the annular protrusion of the check valve plate comprising a frustoconical transition portion between the first interior cylindrical surface portion and the second interior cylindrical surface portion.

12. A shock absorber comprising:

a cylinder defining a chamber therein, said cylinder containing a damping fluid;

a piston rod rod sealingly projecting into said cylinder and being axially displaceable with respect to said cylinder;

a piston being attached to said piston rod, said piston being slidably disposed within said cylinder to sealingly divide said chamber into first and second chambers;

means for permitting fluid communication between said first and second chambers;

said means for permitting fluid communication comprising check valve means, said check valve means having first aperture means and second aperture means, said check valve means being configured for transmitting fluid between said first aperture means and said second aperture means;

said check valve means comprising:

a first body portion and a second body portion;

spring means for biasing said first body portion and said second body portion towards one another, said spring means having a first portion and a second portion;

said first portion of said spring means having means for being fixedly retained on said first body portion;

said second portion of said spring means having means for being fixedly retained on said second body portion;

first means, for fixedly retaining said first portion of said spring means on said first body portion;

second means, for fixedly retaining said second portion of said spring means on said second body portion;

said first retaining means and said second retaining means being configured to hold said first body portion, said second body portion and said spring means together as a modular, interchangeable unit during assembly of said shock absorber;

said first portion of said spring means has an inner diameter portion and an outer diameter portion, and said second portion of said spring means has an inner diameter portion and an outer diameter portion;

one of said inner diameter portion and said outer diameter portion of said first portion of said spring means is fixedly retained on said first body portion;

one of said inner diameter portion and said outer diameter portion of said second portion of said spring means is fixedly retained on said second body portion;

said first retaining means comprises one of:

means for providing a form fit between said first portion of said spring means and said first body portion to fixedly retain said first portion of said spring means on said first body portion; and means for providing a force fit between said first portion of said spring means and said first body portion to fixedly retain said first portion of said spring means on said first body portion; said second retaining means comprises one of:

means for providing a form fit between said second portion of said spring means and said second body portion to fixedly retain said second portion of said spring means on said second body portion;

means for providing a force fit between said second portion of said spring means and said second body portion to fixedly retain said second portion of said spring mean on said second body portion;

said spring means comprises a spring having a central longitudinal axis and two ends;

said spring comprises a plurality of contiguous coils, each of said coils describing about one revolution about said central longitudinal axis of said spring, said plurality of coils comprising a first terminal coil at a first end of said spring and a second terminal coil at a second end of said spring;

said first portion of said spring comprises said first terminal coil;

said second portion of said spring comprises said second terminal coil;

said check valve means comprises:

a seat;

said modular, interchangeable unit being disposed against said seat; and means for permitting displacement of said modular, interchangeable unit away from said seat to promote fluid communication between said first aperture means and said second aperture means;

the means for permitting displacement of the modular, interchangeable unit away from the seat comprises:

armature means; and electromagnetic means for activating the armature means to permit displacement of the modular, interchangeable unit away from the seat;

the first body portion comprises a guide bushing, the guide bushing being generally cylindrical and having an interior surface;

the interior surface of the guide bushing being generally cylindrical;

the second body portion comprises a check valve plate;

the check valve plate is for being disposed against the seat;

the interior surface of the guide bushing is configured to be out of contact with the spring;

the guide bushing has a disk-like protrusion extending therefrom towards the check valve plate;

the check valve plate has an annular protrusion extending therefrom towards the guide bushing;

the annular protrusion of the check valve plate being generally cylindrical and being configured for engaging slidingly with the interior surface of the guide bushing, wherein the annular protrusion of the check valve plate and the interior surface of the guide bushing define a chamber therewithin, the spring being disposed inside the chamber;

the annular protrusion of the check valve plate having a first interior cylindrical surface portion and a second interior cylindrical surface portion;

the first interior cylindrical surface portion is configured to be out of contact with the spring;

the check valve means further comprises:

the first terminal coil of the spring having a smaller diameter than all the other coils of the spring;

the second terminal coil of the spring having a larger diameter than all the other coils of the spring;

the first retaining means comprising means for providing a form fit between the first portion of the spring and the guide bushing, wherein an annular groove is provided in the disk-like protrusion of the guide bushing to accommodate the inner diameter portion of the first terminal coil of the spring therewithin, to provide a form fit of the first terminal coil of the spring with respect to the guide bushing; and the second retaining means comprising means for providing a form fit between the second terminal coil of the spring and the second interior cylindrical surface portion of the annular protrusion of the check valve plate, wherein:

the second interior cylindrical surface portion has a larger diameter than the first interior cylindrical surface portion;

the second interior cylindrical surface portion has an axial dimension configured such that the outer diameter portion of the second terminal coil of the spring is accommodated in the second interior cylindrical surface portion, to provide a form fit of the second terminal coil of the spring with respect to the supplemental discharge valve body; and the second cylindrical surface portion is generally in the form of an annular groove.

* * * * *

UNITED STATES PATENT AND TRADEMARK OFFICE
CERTIFICATE OF CORRECTION

PATENT NO. : 5,467,851
DATED : November 21, 1995
INVENTOR(S) : Günther HANDKE, Lars ROSSBERG and Andreas ZIETSCH It is certified that error appears in the above-indentified patent and that said Letters Patent is hereby corrected as shown below:

On the title page, item [75], before 'Handke,', delete "Günter" and insert --Günther--.

In column 4, line 50, after 'can' delete "preferably".

In column 4, line 55, after 'may' delete "preferably".

In column 13, line 46, Claim 5, after 'body', delete "portions;" and insert --portion;--.

In column 19, line 12, Claim 10, after 'retained', delete "oil" and insert --on--.

UNITED STATES PATENT AND TRADEMARK OFFICE
CERTIFICATE OF CORRECTION

PATENT NO. : 5,467,851
DATED : November 21, 1995
INVENTOR(S) : Günther HANDKE, Lars ROSSBERG and Andreas ZIETSCH It is certified that error appears in the above-indentified patent and that said Letters Patent is hereby corrected as shown below:

In column 22, line 48, Claim 11, after 'disk-like' insert --protrusion of the guide bushing has a diameter configured--.

In column 24, line 6, Claim 12, after 'spring', delete "mean" and insert --means--.

Signed and Sealed this

Twenty-first Day of January, 1997

Attest:

BRUCE LEHMAN

Attesting Officer

Commissioner of Patents and Trademarks